Figure 1:
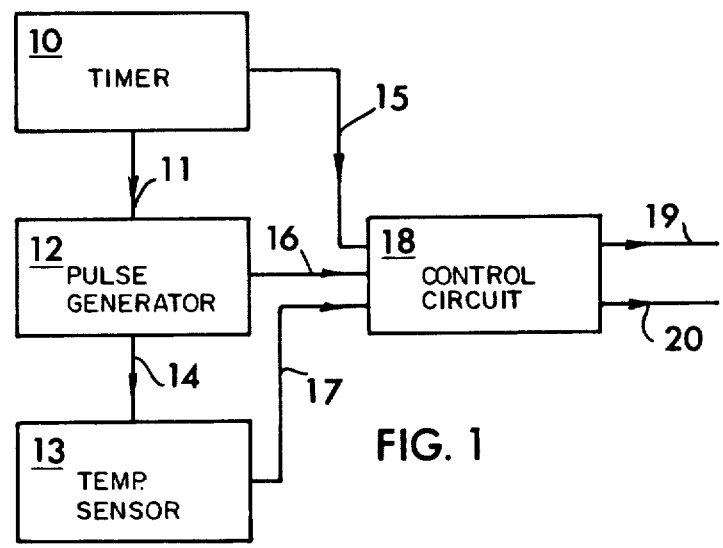

United States Patent [19]

Christiansen

[11] 4,232,818
[45] Nov. 11, 1980

[54] CONTROL UNIT FOR STARTING A CLIMITIZATION PROCEDURE IN A BUILDING

[75] Inventor: Jørn U. Christiansen, Hvidovre, Denmark

[73] Assignee: Tour & Andersson Aktiebolag, Johanneshov, Sweden

[21] Appl. No.: 24,536

[22] Filed: Mar. 28, 1979

[30] Foreign Application Priority Data

Mar. 28, 1978 [SE] Sweden ............................ 7803490

[51] Int. Cl.³ .................... F23N 5/20; G05D 23/00
[52] U.S. Cl. ............................ 236/46 R; 236/91 G
[58] Field of Search .............. 236/46 R, 47, 91 R, 236/91 G; 165/12; 340/309.1; 62/231

[56] References Cited

U.S. PATENT DOCUMENTS

| | | | |
|---|---|---|---|
| 3,392,914 | 7/1968 | Nienstaedt | 236/46 R |
| 3,942,718 | 3/1976 | Palmieri | 236/78 R |
| 3,964,676 | 6/1976 | Rooks et al. | 236/46 R |
| 3,979,059 | 9/1976 | Davis et al. | 236/46 R |
| 4,040,565 | 8/1977 | Christiansen | 236/91 R |
| 4,049,193 | 9/1977 | Haviland et al. | 236/46 R |

Primary Examiner—William E. Wayner
Attorney, Agent, or Firm—Larson, Taylor and Hinds

[57] ABSTRACT

A controller is provided which includes a control unit for controlling the start of a climatization procedure in a building. The system includes a pulse generator which times the operations of the control unit and an equivalent electrical circuit which controls the operations of the control unit. The latter simulates thermal properties of the building during temperature conditioning operations, i.e., heating or cooling, and receives voltages representative of the inside and outside temperature of the building. The discharging, charging or equalization of voltages on condensors contained within the equivalent electrical circuit are used to determine the time for conditioning the temperature of the building after the conditioning system has been out of service for a given period of time and thus in calculation of the correct instant for starting the conditioning procedure by the control unit. A binary type frequency divider divides the output of the pulse generator to produce a pulse train of substantially lower frequency while a decadic counter converts the binary pulses into decadic pulses. The decadic counter produces pulses representative of different ending digits of the decadic numbers, e.g., 5, 7 and 9, and a plurality of different control means for controlling the start of the climatization procedure by the control unit are connected to individual outputs of the decadic counter. Thus, the sequence of operations of the control unit, under the control of the equivalent electrical circuit, takes place in an order determined by the end digits in question.

14 Claims, 6 Drawing Figures

CONTROL UNIT FOR STARTING A CLIMITIZATION PROCEDURE IN A BUILDING

From the German specification No. 26 17 154 under public inspection a control unit is known regarding the starting of a climatization procedure in a building. It is assumed that the building which is used during day hours only and/or the working days of the week was left in between these times without climatization, independently of whether said climatization is provided regards heating of the building or its cooling to an agreeable temperature.

According to said published specification, an equivalent electric circuit is provided, symbolizing the run of the heating of the building by means of an electric decharging current or charging current or equalization current representing the feed of heat to the building or the removal of heat from the building, respectively. The electric equivalent circuit is controlled at least by the outside temperature and the internal temperature, but also other climatic conditions may influence the function of the electric equivalent circuit, such as the speed of the wind, the moisture and the like. Further, the equivalent electric circuit is adjustable with respect to the values of its elements such as condensors and/or resistors so as to correspond to the properties of the building.

The arrangement functions in a way that during decharging, charging or voltage equalization in the equivalent electric circuit a charging procedure of high frequency pulses will take place in a counter, which is so constructed that it will, guided by a given starting point of time before the time proper, when the agreeable temperature or the agreeable climatic relation should exist within the building, and also guided by the number of pulses, counted during the period of time for change of the load of the equivalent circuit, determine the correct time for starting the climatization system for the building, so that this will not only be started as late as possible but nevertheless be started at such a time that the agreeable climatic relation will have been achieved at the time when the building shall again be taken into use. By this it is desired to decrease the need of power for the climatization system as far as possible without thereby renouncing the climatic relations during the time when the building is in use.

The present invention concerns an improvement of the above indicated, known arrangement by which an increased accuracy is obtained and also more simple and reliable operation is achieved, in which regard can be taken to as many different factors as possible which may influence the faultless operation of the climatization procedure.

As in the arrangement for the same purpose, known from the German publication specification No. 26 17 154, an equivalent circuit is also used in the arrangement according to the present invention, by which the relations during the heating of the building are imitated after a period of time during which the building was unused, by connecting into the equivalent circuit condensers as symbols for the heat capacity of different parts of the building and electric resistors as symbols for the heat technical resistance of parts of the building and voltages as symbols for the temperatures in part inside of the building, in part outside of the building. The condensers are charged by a voltage corresponding to the outside temperature relations and a voltage difference is created by means of the voltage corresponding to the inside temperature relations.

In the known arrangement, use is made of the fact that the equalization of the charge voltage of the condenser or the condensers, respectively, will follow an exponential curve of identically the same general shape as the exponential curve along which the conditioning of the building will take place under influence of for instance a heating system, which takes place in such a way that the conditioning unit is started a given period of time in advance of the starting of the heating procedure, the voltages of the equivalent circuit thereafter being allowed to equalize until there exists a state of voltages, corresponding to the desired conditioning of the climatic relations of the building. During the equalization of the voltages high frequency pulses are fed to a counter, but the counter is limited to receive a precise number of pulses and after the equalization has taken place of the charge voltage the frequency of the pulse train is rather much decreased, for instance in the relation to 1:10.000, whereafter the counter is allowed to continue its counting with this pulse frequency. When the maximum number of pulses has been counted, a waiting period of time has been identified, which will, thus, be shorter the longer the time of the voltage equalization and longer the shorter the time of the voltage equalization. Consequently, the shorter the period of time of the voltage equalization and the longer the waiting period of time, the shorter will the period of time be which remains until the work starts again in the building and vice versa. In this way one could get a good proportionality between the time of the voltage equalization in the equivalent circuit, on the one hand, and the time of conditioning before the building is again in use, on the other hand.

Now, it may happen that for instance the feed of electric current is cut off whereby the function of the system may be delayed to such an extent that in spite of current being again available at the time when the heating should ordinarily be started, this time is displaced by the same amount as the one during which the cut off of the current lasted. This is a first disadvantage of the known arrangement.

Further, the known arrangement will be extremely sensitive to disturbances due to the high pulse frequency required, and still more by all of the functions being controlled directly to this high pulse frequency.

Both of these disadvantages are avoided according to the present invention by creating, by means of a high pulse frequency, a time pattern under successive pulse frequency division, the time points concerned being placed in the correct sequence in said pattern and being appropriately spaced in time from each other.

The invention, thus, concerns a control unit for starting a climatization procedure in a building, according to which a pulse generator is arranged to create pulses and an equivalent electric circuit is arranged to imitate the thermal properties of the building during heating or cooling, said equivalent electric circuit being fed with a voltage as a symbol for the internal temperature in the building and also with a voltage as a symbol for the external temperature outside of the building, a charge or an equilization of one or more condensers taking place over resistors contained in said equivalent electric circuit as a symbol for the period of time required for conditioning the temperature of the building after said building has been unused during some time. The time for the charging, or the discharging, or the equalization, thereby, is very short in relation to the time for the conditioning of the temperature of the building but is used for calculation of the correct moment for starting the conditioning procedure so that no wasted time shall lapse during which the conditioning system is working but in spite of this the conditioning be effected at a given moment.

According to the invention, a pulse generator is arranged to create pulses of a very high frequency, said pulses being fed to a pulse frequency divider of binary type creating a pulse train of an essentially lower frequency in its output circuit. One output circit conduit from said pulse frequency divider is connected directly or indirectly to a decadic counter which transforms the binary pulses into decadic pulses. The coincidence circuits in the decadic counter are connected such that in each of them only such pulses are let through which represent different numerical values for the last figure in the decadic series of figures. Connections to different means in the control unit provide for controlling said means in an order of sequence determined by said last figures.

The invention will be further described below in connection with an embodiment shown in the attached drawings, but it is understood that the invention shall not be limited to this specific form of execution but that all different kinds of modifications may occur within the scope of the invention.

Figure 2:
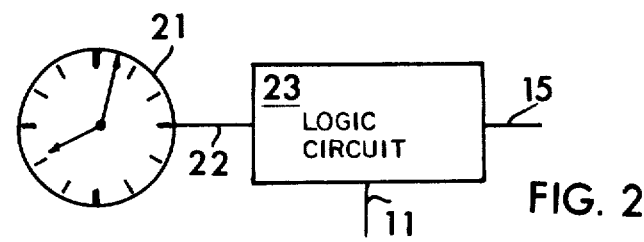

In the drawings, FIG. 1 shows a general block diagram of an arrangement according to the invention, comprising a time determining circuit, a pulse circuit, a temperature sensing circuit and a control circuit. FIG. 2 shows more in detail a block diagram of the time determining circuit, FIG. 3 the temperature sensing circuit, FIG. 4 the pulse circuit, FIG. 5 the control circuit, all of which in detailed block diagrams, and FIG. 6, finally, shows a preferred embodiment of the electric equivalent circuit.

In FIG. 1, thus, the time determining circuit 10 is shown, which has for its purpose to connect or disconnect the arrangement, respectively, at given moments of time, which are either at the beginning of working hours or at the end of them and/or before the working time of the day starts on a monday after a week end or at the end of working hours during the preceding friday. This time determining circuit 10, over a conductor or conduit 11, is connected to a pulse circuit 12, which creates pulses of the frequencies described below, and also counts them and compares them with voltages derived from an electric equivalent circuit. The latter is contained in the temperature sensing circuit 13 to which the pulse circuit is connected by means of the conduit 14. All of the three circuits 10, 12 and 13 now mentioned are connected by one of a group of conductors 15, 16 and 17, respectively, to the control circuit 18, which can, over conductors 19 and 20 start or stop, respectively, the conditioning system concerned. For purposes of simplification the system will in the following be described as if it comprises a heating vessel for radiator heating of the localities, the air of which should be conditioned, but this should only be understood as an explanation and simplification but not as a limitation of the scope of the invention. Thus, the invention may as well concern some other type of air conditioning system for instance a cooling system or equipment for ventilation with respect to which one desires to avoid unnecessary consumption of power during periods of time when the building is not used.

The time determining circuit which is shown schematically in FIG. 2 comprises a timer 21, which is shown here in the form of a twelve hour watch. In reality, the timer should, of course, have a longer periodicity. If the conditioning system is only shut off during night hours, the watch may have a periodicity of twenty four hours, but if the conditioning system shold also be shut off during week ends, it should have a periodicity of one week. The timer 21, by means of a conduit 22, is arranged to control a logic circuit 23. This is done over the conduit 11 connected to the pulse circuit in a way which will be described later on, and it is also, over the conduit 15, connected to the control circuit 18, also in this case in a way which will be described below.

Figure 3:
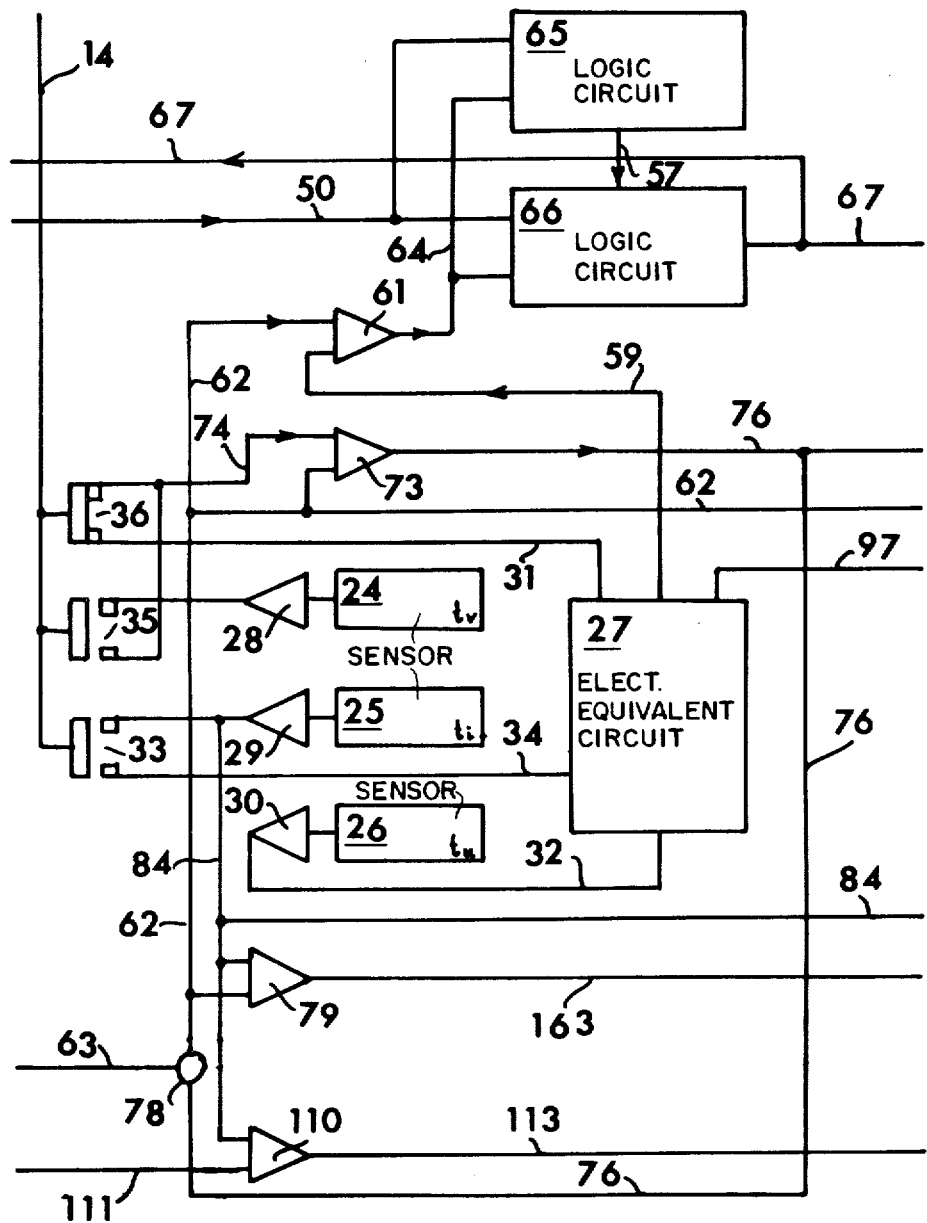

The temperature sensing circuit 13 is reproduced in block diagram form in FIG. 3. The input temperature information is derived from three temperature sensors 24, 25 and 26, which may be thermistors along with the circuit elements pertaining thereto. The temperature sensor 24 senses the temperature in the interior of the intermediate walls in the building, below indicated as $t_v$, the temperature sensor 25 senses the interior air temperature in some given place in the building, which may be regarded representative for all of the building, but it is, of course, also possible, for this purpose to use some combination of a plurality of co-operating temperature sensors, known per se. This temperature, in the following, is indicated by $t_i$. The temperature sensor 26 senses finally the temperature outside of the building, below indicated by $t_u$. The electric equivalent circuit, comprising combinations of resistors and condensers, by means of which the heating conditions in the building are imitated, is indicated by 27.

Each of the three temperature sensors 24, 25 and 26 is connected to an amplifier 28 or 29 or 30, respectively. They have the purpose of producing voltages in the form of pure direct current voltages, which are proportional to the usually rather weak voltages from the temperature sensors, the amplified voltages being better adapted for the control procedure concerned.

The temperature sensor 26 for the outside temperature $t_u$ is connected with its out put circuit from the amplifier 30 over a conduit 32 to the electric equivalent circuit 27, and the temperature sensor 25 for internal temperature $t_i$ is, over its amplifier 29 and an electronically controlled switch 33 as well as a conduit 34 also connected to the electric equivalent circuit 27. An advanced embodiment of same will later on be described in connection with FIG. 6. Thus, it should be mentioned that the internal temperature $t_i$ in the building only starts to influence the climatization procedure or the heting procedure in the building, after the electronically controlled switch 33 has been closed. This electronically controlled switch 33, as a matter fact, co-operates with two further electronically controlled switches 35 and 36 under influence of a current, which is transferred by means of the conductor 14 from the pulse circuit 12.

Figure 4:
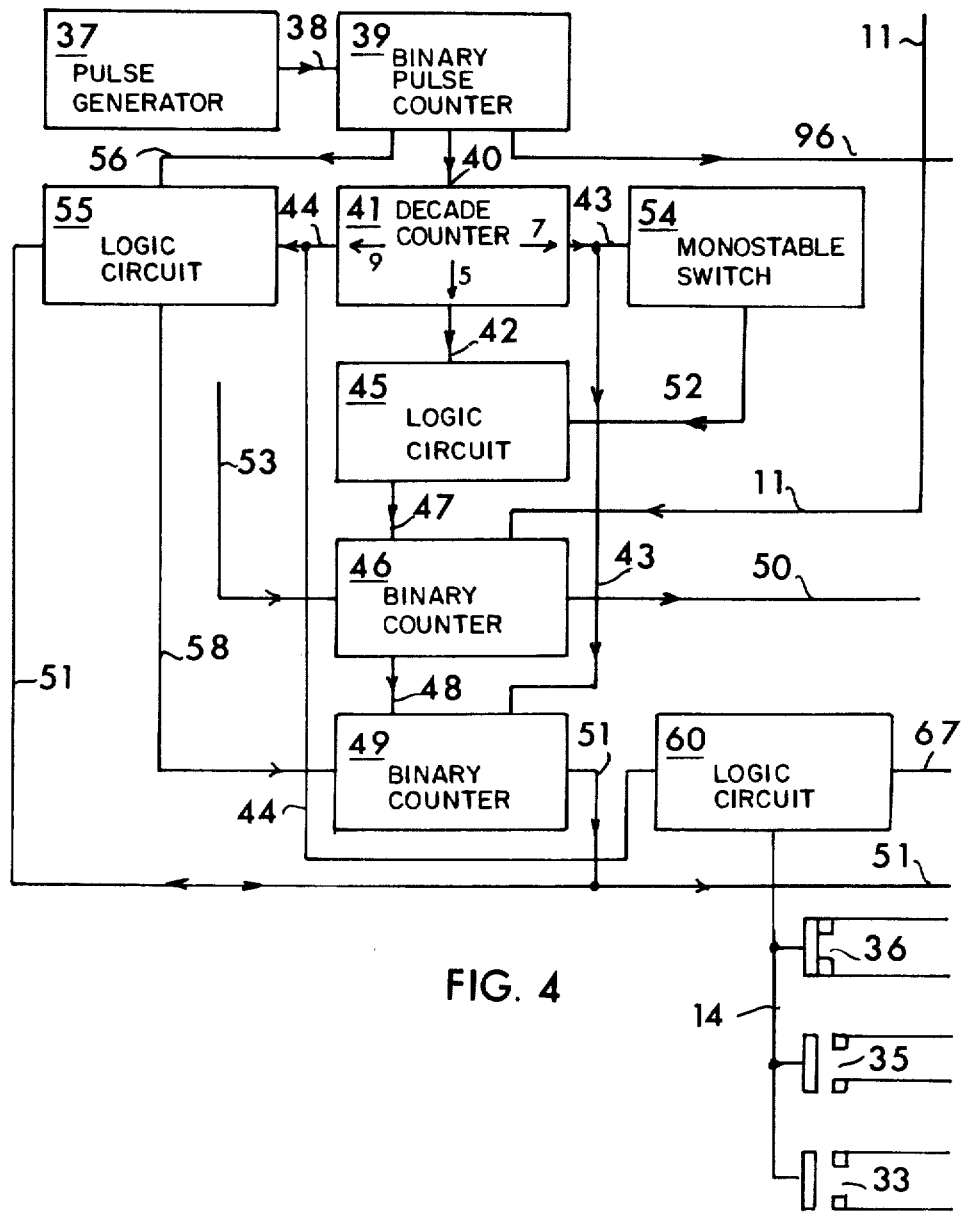

To make the coupling arrangement more clear, the conductor 14 along with the three electronically controlled switch contacts 33, 35 and 36 have been shown both in FIG. 3 and in FIG. 4.

Now, it may be suitable to give account in short terms of the parts of the pulse circuit concerned. This circuit is shown in detail in FIG. 4. The basic pulse generator in this circuit is indicated by 37. It has a very high pulse frequency, which may for instance be 1 megacycle per second. This pulse frequency, of course, is not of decisive importance for the invention, and there is a possibility to use other pulse frequencies. However, generally it is advantageous, if the said pulse frequency is high, because the pulse generator preferably is crystal controlled in order to create a constant pulse frequency of a lower order of magnitude for given subsequent circuits, as will be described later on. It is well known to the man skilled in the art that the relative constancy of any working circuit may be considerably increased if one creates first a very high constant frequency and thereafter, by frequency division, decreases this frequency down to the working frequency.

The pulses from the pulse generator are transferred over the conduit 38 to a binary pulse counter 39, which has for its purpose in first place to cause such a frequency division by means of suitably arranged coincidence circuits. This part of the arrangement would scarcely require any further description as it is well known to any man skilled in the art how the said procedure takes place. The result of this frequency division nevertheless will be that pulses of a considerably lower frequency will be transmitted in the output circuit of the pulse frequency divider. This reduced frequency when following up the above given example value of the basic frequency, may be assumed to be 2 kilocycles a second. It should be reminded about, in this connection, that it is possible, by successive pulse divisions by two, to reduce a frequency of 1 megacycle a second to 1,953.125 periods a second which may, with completely satisfactory approximation be said to be 2 kilocycles a second.

One of the three output circuits from the binary pulse frequency divider 39 is connected over the conduit 40 to a decadic counter device 41 for recalculation of the binary pulses into the decadic system, i.e., to provide conversion from a binary to a base ten system. This decadic counter 41 may but must not necessarily further reduce the frequency of the pulse train transferred over the conductor 40. On the other hand, however, the decadic counter is arranged to give off signal pulses through its output conduits 42, 43 and 44 in a given order of time, viz. to produce a pulse on the conductor 42 each time when the decadic series of figures ends on the FIG. 5, on the conductor 43 each time when the decadic series of figures ends on the FIG. 7, and on the conductor 44 each time when the decadic series of figures ends on the FIG. 9. These terminal figures, of course, are arbitrarily chosen, and they could as well have other values. It is valuable if each such terminal figure differs from the one next before and from the one next after by two units.

The pulse frequency of these three decadic series of figures is, in the exemplary embodiment, 84 pulses a second, but as before, the number of pulses may be chosen in another way. The pulses carrying the final FIG. 5 thus run with a number of pulses of 8.4 pulses each second to a logic circuit 45, which controls directly a binary counter 46 over the conduit 47 and also over its output circuit 48 controls a second binary counter 49.

The two binary counters 46 and 49 are constructed for counting $256 = 2^8$ steps. They are provided with eight output conductors, bundled together into clusters of conductors 50 and 51, respectively. The two binary counters 46 and 49, however, are further subjected to the influence of control signals, one of which being introduced over the conductor 52 and the logic circuit 45, and the other one over the conductor 53 and the binary counter 46. These control signals act in such a way that, when such a signal is fed into the binary counter (46 or 49), concerned, when the counting of pulses will cease in said binary counter. Further, an input circuit to the binary counter 46 is connected to the conductor 11 from the timer actuated counter 22, FIG. 2, whereby it is possible to determine, if the counting in the binary counter shall be taking place or not. If a signal is transferred over the conduit 11, allowing the binary counter 46 to work, so will counter 46 thereafter count pulses until a given end position. When it has reached this value, the said state is marked by voltage being connected to a output conductor 50 from the binary counter 46.

Figure 5:
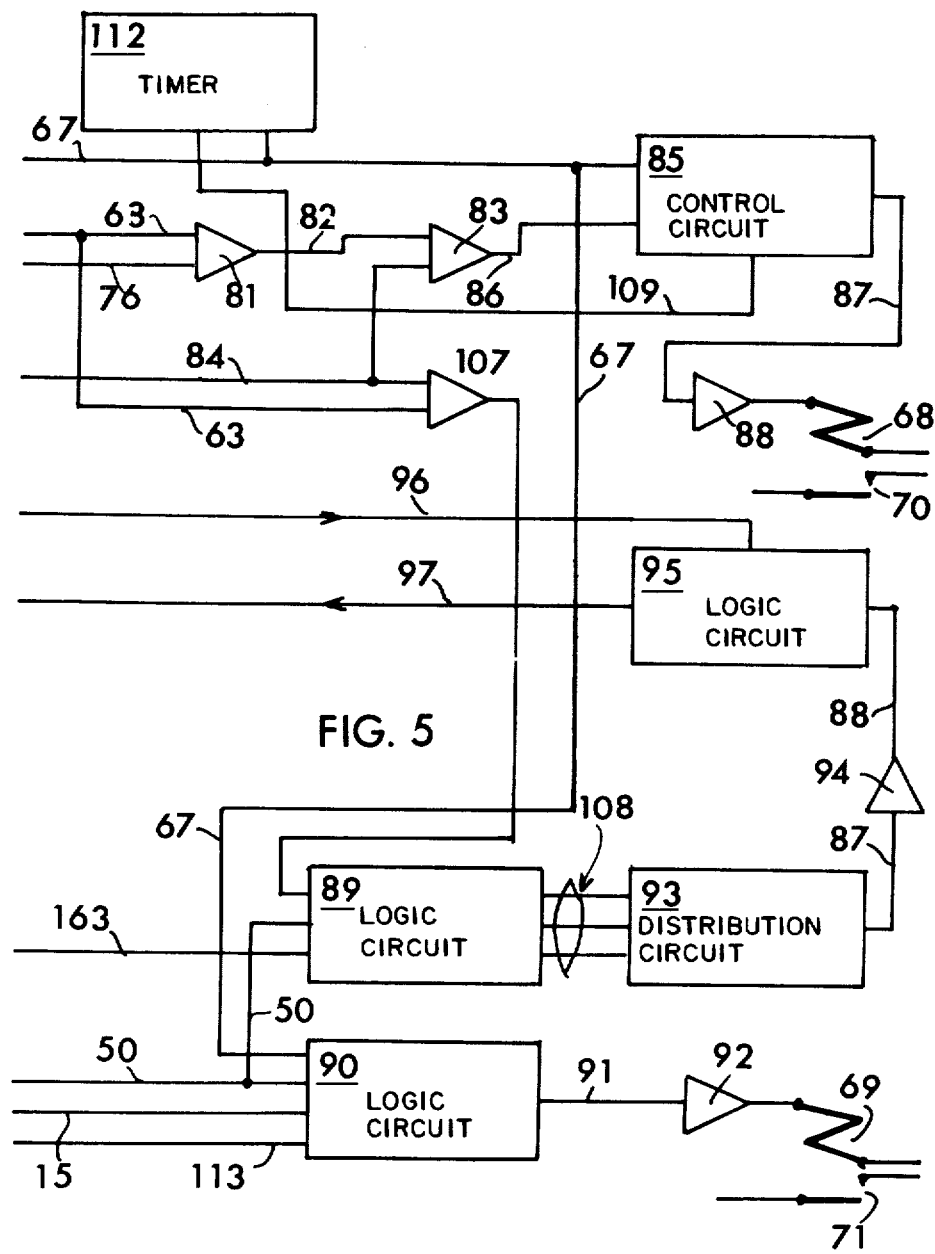

When a pulse with the final FIG. 5 has been registered in the logic circit 45, a pulse having the final FIG. 7 will be fed to the device 54 acting as a monostable switch for pulses. This is then switched over so that it will create a temporary stop signal over the conductor 52 to the logical circuit 45, and as a consequence thereof, this logic circuit will not register the next following pulse of the final FIG. 5. When thereafter another pulse with the final FIG. 7 is transferred to the pulse switch 54, this is again turned over and the stop signal over the conductor 52 is removed with the consequence that the logic circuit 45 will again register the next pulse of the final FIG. 5 over the output conduit 42. In this way, the logic circuit 45 will only register every second pulse with the final FIG. 5.

As the pulse frequency of the decadic series was 84 pulses each second, the distance in time between each such step fed pulse and the next one will be 168 seconds, which means that the counting of 256 steps will take a time of 12 hours. As a matter of fact, the indicated pulse frequency time will be 198 seconds shorter than 12 hours, but this little error in time is without any importance, because it is not accumulated from one day to another one, because the system is started again every day by influence from the timer 21. The entire conductor 53 is connected to a manually or automatically controlled device, by means of which one can transmit a stop signal to the binary counter 46, connected to some suitable place in its coincidence circuits, so that the counting will stop after one fourth or after the half or after three forth of the said time of 12 hours or in other words, after three hours or after six hours or after nine hours. Of course, it is most suitable to provide three different conductor wires, which have, however, been symbolized, in FIG. 4, by means of one single line 53. As soon as the given period of time of three or six or nine hours has lapsed, a marking signal is transmitted over the cluster of wires 50 to parts of the system according to the invention, which will be described in connection with FIG. 5, because they rather belong to the control circuit, which is the one shown in said figure.

Although each pulse from the decadic counter 41 having 7 as its final figure was fed to the monostable switch 54 in order to control the operation of the logic circuit 45, the output conduit 43, however is branched off also to the binary counter 49. Also here, the said pulses serve as stop signals, and consequently, the two binary counters 46 and 49 will get the same pulse frequency and the same indication of time in their output clusters of conduits 50 and 51, respectively.

The logic circuit 55 gets pulses of two different kinds, viz. high frequency pulses of a frequency, which was above as an example said to be 2 kilocycles a second, over the conduit 56 from the pulse frequency divider 39, and also pulses over the conduit 51 which forms the output circuit from the binary counter 49. The pulses with 9 as their end figure from the decadic counter 41 cause the logic circuit 55 enable feeding the pulses from the pulse frequency divider 39 over conduit 56, the logic circuit 55 and the conductor 58 to the binary counter 49 for counting. This pulse counting, however, is stopped by the logic circuit 55 when the maximum number of pulses has been counted. In the parts hitherto described the coupling arrangement functions in the following way:

It should first be assumed that the pulse switch 54 is in such a position, that the logic circuit lets through a pulse with the end FIG. 5 from the decadic counter 41 to the binary counter 46. When this pulse of the end FIG. 5 is transferred over the conduit 42, it will pass through the logic circit 45 and, consequently, the binary counter 46 will be stepped forward by one step. With the intervals of time explained above thereafter 16.8 seconds will pass, until another decadic pulse with the end FIG. 7 is transmitted over the conduit 43. This will cause two operations:

Firstly, this pulse will by means of the pulse switch 54 control the binary counter 45 in such a way that the pulse with the FIG. 5, following next thereafter will not be counted.

Secondly, this pulse causes the binary counter 45 to transfer the pulses from its input circuits to its output circuits.

After the run of further 16.8 seconds, a pulse comes in with the end FIG. 9 in the output conduit 44, and this pulse will then act upon the logic circuit 55 so that the quick pulses from the pulse frequency divider 39 may pass over the conduit 58 and step the binary pulse counter forward until it reaches its pre-determined maximum value of counted pulses. It may happen that the binary counter 49 will at some time be in its intial position, and then 120 milli seconds are required in order that it shall reach its maximum value. This period of time of 120 milli seconds in the binary pulse counter corresponds therefore to a period of time of twelve hours in the binary counter 46.

Through conduit 44, which only contains such decadic counter pulses, the end figure of which is 9, however, the decadic counter 45 also reaches a logic circuit 60, which, over conduit 14 feeds current to the three electronically controlled switches 33, 35 and 36 so that they are actuated, the switches 33 and 35 thereby being closed and the switch 36 being opened.

In this way the activity of the remaining parts of the system according to the invention is initiated, and, therefore, reference shall now again be made to FIG. 3, just mentioned.

The three electronically controlled contacts 33, 35 and 36 along with the activation conduit 14 for their control are also found in FIG. 3.

It will be evident from the above that by the function of the pulse circuit 12 such as has been explained in connection with FIG. 3, a time program with fixed and well defined intervals of time has been created so that, so to say, a time scale has been obtained which may be used for starting the heating system as late as possible, nevertheless, however, so early that full conditioning of the building shall have been obtained at the time for its renewed taking into use. By this the double advantage is gained that there is not only no unnecessary consumption of power by the heating system being started too early, but also full conditioning has been achieved to the agreeable temperature, when the building is taken into use again after an interruption of the conditioning.

The electric equivalent circuit 27, over a conductor 59, is connected to one of the inputs of an amplifier 61, the other input of which is connected, over a conduit 62, to a conduit 63 from some device with the task to indicate by means of a voltage the desired, agreeable temperature in the building. This conduit 63, in the following, will be refered to as the "optimum temperature conduit". It is adjustable manually from some place not shown in the drawing in order to indicate a voltage as a symbol for the temperature, e.g. 20° C., which is desired within the building, when work in the same shall again start.

If now the amplifier 61 should show similarity or a given relation between the state in the form of a voltage, impressed thereon from the equivalent circuit 27, on the one hand, and the voltage, which is fed over the conduit 62 from the optimal temperature conduit 63, on the other hand, then this will mean that the desired agreeable temperature has been obtained inside of the building. Thereby a signal is transmitted over the conduit 64 to the two logic circuits 65 and 66 in parallel. These logic circuits 65 and 66, however, also have another input, which is fed in parallel from the conduit 50 leading from the binary counter 46, FIG. 4. The logic circuit 65 has for its purpose to register the state of the amplifier 61 at the moment when the signal arrives over the conduit 64 and to transmit over the conduit 57 a signal to the logic circuit 66. This signal compares the state of same amplifier 61, however at the end next before of a testing period of 84 seconds, said period of time being measured in the way apparent from the above.

Now, it may first be assumed, that the signal over the conduit 64 from the amplifier 61 indicates, at a given time, that the agreeable temperature, such as this has been symbolized by the electric equivalent circuit 27 along the voltages fed to same from the sensors 25 and 26, has been achieved, which, of course, only is a symbolic matter of fact but does not mean that the temperature proper in the building has been increased to the value concerned. The statement about this is then stored in the logic circuit 66, and the procedure described above is repeated after a period of time of 84 seconds, when another signal is transferred to the circuits 65 and 66. Also this renewed signal is transferred from the circuit 65 to the circuit 66, where the result of the test next before has previously been stored. If, in this way, two tests following each other with a time difference of 84 seconds, should prove, that the agreeable temperature has been achieved, which is thus still only symbolized by the electric equivalent circuit 27, no start signal is given off through the output conduit 67 to the control circuit 18, which is further described in FIG. 5, and which should otherwise have caused starting of the heating system in order of the conditioning proper of the air in the building.

Here, it should especially be emphasized that because the logic circuit 55, as explained above, is only stepped forward every second time when a combination of figures with the end FIG. 9 is given off to same from the decadic counter 41, two equivalent tests of identically the same length of time will always follow immediately after each other.

If two tests following in this way after each other should give mutually different results, nothing further happens in the system but the tests continue with the above mentioned repetition periodicity of 84 seconds.

If, on the other hand, two tests following immediately after each other with a duration each of 84 seconds should prove that in neither of the said cases the desired optimum temperature has been reached in the electric equivalent circuit 27, symbolizing the increase of temperature, then this is taken as a proof of that the heating system should be started. In this case, a start signal is given off to the control circuit 18 over the output conduit 67 and the heating system is started in a way which will be described in connection with FIG. 5.

The total time for the two tests amounting to 168 seconds or less than three minutes, of course, is short when compared with the actual heating time, which may, dependent upon how far the cooling has proceeded during the period of inactivity, for instance amount to twelve or nine or six but under all circumstances rarely to less than three hours, said periods of time being manually or automatically settled on basis of experience or measurement, respectively, of the heating time period of the building at different outside climatic relations, by means of the optimum temperature conduit 63, FIG. 3, in co-operation with the voltage on the conductor 53 and its time dependency. The fact that two tests following after each other are used for determining if the heating system should be started, however causes a practically complete security against failure function of the system. It should be mentioned now that the starting of the heating system normally takes place by energization of a relay 68, but under given circumstances this may also take place by energization of a relay 69, FIG. 5, their contacts 70 and 71, respectively, being connected into the existing starting conduits of the heating system. This part, however, has no direct connection with the present invention.

The output conduit 67 from the logic circuit 66, FIG. 3, is however also branched off to the logic circuit 60, FIG. 4 with the result that the three electronically controlled switch contacts 33, 35 and 36 are reversed. This causes a re-arrangement of the voltages fed to the electric equivalent circuit 27, FIG. 3. Thus, at the contact 36 the conduit 74 is disconnected from the amplifier 73, which is, in turn, connected with one input conductor to this electronically controlled contact 36 and with another input conductor is connected to the optimum temperature conductor 63 over the conductor 62. The amplifier 73 will measure the difference between the wall temperature $t_v$ and the optimum temperature, so that the voltage in the output circuit 76 of said amplifier 73 will vary at least approximately proportional to said voltage difference. The output circuit 76, however, is also branched off to a combination of resistors 78 in the optimum temperature conductor 63, so that, as a matter of fact, the input signal to an amplifier 79 with two input conduits will, as regards the conduit 62, represent a combination, e.g. the sum of the optimum temperature voltage and the said voltage difference just mentioned in the output circuit 76 from amplifier 73.

When a building is cooled due to the fact that it has also not been heated during the period of time when it was not used, the walls are cooled, due to their heat capacity, at a slower rate than the air in the interior of the building, but upon heating the circumstances will be reversed. Consequently, at least during an essential part of the heating period, the temperature in the walls in the interior of the building, especially the intermediate walls, is lower than the air temperature. If the conditioning should now be controlled exclusively by the temperature of the outside air and of the air in the interior of the building, so that the heating will be interrupted when the last mentioned temperature has risen to the optimum value, then a cooling of the air would immediately start by heat being transferred to the walls thereby increasing the lag of temperature.

It is for this purpose that a separate sensor 24 with its amplifier 28 has been provided for sensing the temperature $t_v$ in the interior of the walls. This sensor 24 normally is not connected to the electric equivalent circuit 27, the contact 35 being open, but at voltage on the conductor 14, this contact 35 is closed simultaneously with the opening of the contact 36.

What happens first, of course, is that an equalization of the voltages on the condensers in the electric equivalent circuit will take place by the sensor 25 for sensing the interior air temperature $t_i$ along with its amplifier 29 being connected to said equivalent circuit 27, whereafter, in the way described above, a sensing of the interior air temperature $t_i$ will reach a level which after completion of the equalization would cause that the heating would stop, if no booster circuit existed.

The voltage difference between the inner air temperature $t_i$ and the wall temperature $t_v$, thus, is introduced after amplification in the amplifier 73 into the control procedure. Over the conduit 76, thus, a voltage representing the wall temperature $t_v$ is transferred to an amplifier 81 by means of one of its input circuits but simultaneously by means of its second input circuit and over the conduit 63 a voltage representing the optimum temperature is fed so that a voltage will appear in the output circuit 82 of the amplifier 81, referred to as the "booster voltage", said voltage being a little higher than the voltage which would represent the internal temperature $t_i$. This voltage is fed over a conductor 82 to an amplifier 83 having two inputs. The other input of this amplifier 83 is connected over the conduit 84 with the output side of the amplifier 29, which indicates an amplified expression for the voltage, corresponding to the interior air temperature $t_i$ in the building as sensed by the sensor 25. In this way, one will get a comparision between the two voltages over the conductors 82 and 84, in the amplifier 83.

Consequently, when the room temperature, i.e., the air temperature $t_i$ inside of the building, has reached a preselected value, indicated by the amplifier 81, a signal will be transmitted from the amplifier 83 to a logic control circuit 85 over the conduit 86. At this time, the control circuit 85, when the said voltage value has been achieved, will cause that the current in the conduit 87 and the amplifier 88 to the relay 68 is cut off, so that this relay will be de-energized and its contact 70 will be opened, and the normal, temperature controlled function of the heating system will cease.

Simultaneously with the attraction of the relay 68 for the normal operation of the heating system, however, also the relay 69 is energized, however without any other effect than that its contact 71 was closed in parallel to the closed contact 70 of the relay 68.

The above mentioned circuit, however, provides that after the opening of the contact 70 the contact 71 will remain closed. This state will continue during a period of time the end of which is determined by the timer circuit according to FIG. 2 by a voltage drop on the conductor 67 and, due to its connection to the logic circuit 90 de-energization relay 69 of.

In this way, thus, security has been gained for a subsequent heat creation in the building for compensation of the loss of heat, caused by the heat of the air in the building being conducted away to the initially colder walls.

As an alternative of the above mentioned arrangement one may over a conduit 109 connect the circuit 85 with a separate timer 112, which is, thus, started simultaneously with de-energization of the relay 68, but which over the conduit 67 acts upon the logic circuit 90 so that the relay will remain atracted during a period of time adapted for the said equalization of the temperature.

In FIG. 4, a binary counter 46 is shown, the function of which has previously been briefly described. An output conduit 50 from this binary counter 46 runs to a logic circuit 68 as well as a logic circuit 90. These are contained in a greater circuit arrangement which could be said to form an adaptive circuit for improving the adaption of the heating procedure to the internal circumstances in the building. At a given voltage in the logic circuit 90, amplified in the amplifier 92 in the output conduit, thus, will cause the relay 69 to be energized and close its contact 71.

As a matter of fact, it may happen that the desired agreement between the actually existing heating relations, on the one hand, and the heating relations symbolized in the electric equivalent circuit, on the other hand, are not in agreement, which may depend upon many different circumstances which are impossible to discover in advance, such as the execution of a heat creating job within the building of the like. In such a case, the logic circuit 89 will become active, thereby causing, over a distribution circuit 93, a conduit 87, an amplifier 94 and a conduit 88 as well as a logic circuit 95 a temporary correction of the constants of the equivalent circuit 27. The logic circuit 95, is also fed with pulses over the conduit 96 from the pulse frequency divider 39, FIG. 4. In the case of an disagreement, circuit 95 gives off a signal over the conduit 97 to the equivalent circuit 27 for correcting the error between its symbolic properties and the real properties of the heating system, the building and so on.

Figure 6:
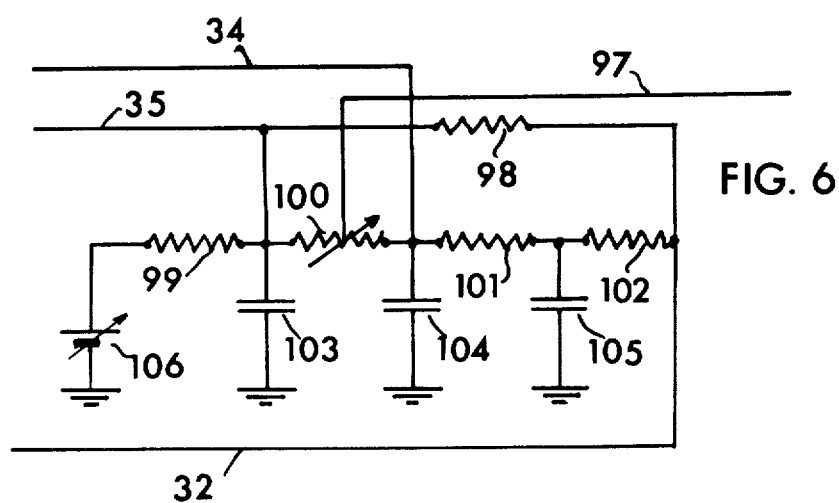

The equivalent electric circuit is shown in the form of an exemplary embodiment in FIG. 6. The different input conductors to the electric equivalent circuit according to FIG. 6 are formed by the conductors 32, 34, 35 and 37 previously mentioned, the three first of which being connected to the amplifiers after the sensing means for temperatures in order of introduction of the voltages determining the climatization, whereas the last one forms a correction conduit. It is without any decisive importance to the present invention in what manner the coupling elements of the electric equivalent circuit represent properties important to the extent of the heating of the building, and for this purpose, therefore reference is given to the above mentioned German specification No. 26 17 134.

The circuit, thus, is shown in FIG. 6 to be composed of five resistors 98-102, three condensers 103-105 and an electric source of current 106. The resistor 100 is variable under influence of a voltage, which is fed over the conduit 97. For instance, it may be formed by a magnetorestrictive resistor under influence of a magnetic winding fed with current over the conduit 97, or be a thermally variable resistor, influenced by a heater winding, which gets, in turn, its heating current over the conduit 97. The source of electric voltage 106 is intended for manually adjusting the electric equivalent circuit to adapt the voltages, obtained after amplification from the different temperature sensing means. The adaptive system just mentioned in the arrangement is controlled by the amplifier 107, FIG. 5, which is fed at both of its inputs firstly with the voltage from the amplifier 29 after the sensing means 25 for the internal temperature $t_i$, which takes place over the conduit 84, and secondly with the optimum temperature voltage over the conductor 63. It gives off its output voltage to the logic circuit 89 over a conduit 108. The logic circuit 89, further, is connected to two further input conduits, viz. the conduit 163 from the amplifier 79, FIG. 3, which receives at one input the voltage from the ampli- 29 after the sensing means 25 for the temperature of the interior temperature $t_i$ and at the other input a signal on the conduit 63 for the optimum temperature voltage. The logic circuit 89 also is connected to the conductor 50 from the binary counter 46, previously mentioned. In this way, it is possible, by comparison of voltages in this logic circuit 89 to state if the air temperature $t_i$ in the interior of the building has reached the desired optimum temperature before or after the signal from the binary counter 46 carried by conduit 50 indicates that the binary counter has counted its maximum number of pulses. Dependent upon the result of this control, the required number of pulses is added or deducted, respectively, in the counter 93, which after the correction of the number of pulses counted will, over the amplifier 94 influence the logic circuit 95. Also this correction is transferred, over the conductor 97, to the electric equivalent circuit for its subsequent correction.

As a further matter of security, the output conduit from the amplifier 29 provided for the interior air temperature $t_i$ is connected to one of the inputs of an amplifier 110, which is, with its other input 111, fed with a fixed or adjustable voltage, serving to limit the function of the logic circuit 90. The output conduit 113 forms one of the four input conduits of the logic circuit 90, the remaining input conduits of which are the conduit 67, the conduit 50, and the conduit 15 from the timer circuit, FIGS. 1 and 2.

This last mentioned arrangement operates such that if the air temperature $t_i$ in the interior of the building when compared in the amplifier 110, would prove to be, for one reason or another, below the normal value, then over the conduit 113 a signal is transmitted to the logic circuit 90 and through this over the conduit 91 to the amplifier 92, whereby the relay 69 will be energized and, by closing its contact 71, add the additional heating, the normal thermostatically controlled function of the heating system continuing over the contact 70 of the relay 68.

I claim:

1. A control unit for controlling the start of a climatization procedure in a building, wherein a pulse generator is provided for generating pulses used in timing the operations of the control unit, first and second temperature sensor means are provided for sensing the interior temperature of the building and the external temperature outside of the building and for respectively producing first and second voltages in accordance therewith, and an equivalent electrical circuit for controlling the operations of the control unit is arranged to simulate the thermal properties of the building during temperature conditioning operations, i.e., heating or cooling, the equivalent electrical circuit being fed with a said first voltage representative of the interior temperature in the building, and a said second voltage representative of the external temperature outside of the building, and the time required for a discharge, a charge or an equalization of one or more voltages on condensers contained in the equivalent electrical circuit being representative of the period of time required for conditioning the temperature of the building, after the conditioning system has been out of use during a predetermined period of time, the discharge or charge or equalization time being short as compared with the time for conditioning the temperature of the building and being used for calculation of the correct moment for starting the conditioning procedure by the control unit, said pulse generator being arranged to generate pulses of a very high frequency, and said control unit further including a binary type pulse frequency divider for receiving pulses from said pulse generator and for producing a pulse train of binary pulses of a substantially lower frequency, a decadic counter connected to one output of said pulse frequency divider for converting the binary pulses into decadic pulses, said decadic counter including coincidence circuits connected to a plurality of outputs of the decadic counter for producing pulses representative of different end digits of the decadic numbers, and a plurality of different control means for controlling the start of the climatization procedure by said control unit connected to individual ones of said outputs of said decadic counter so that the sequence of operations of said control unit under the control of said equivalent electrical circuit takes place in an order determined by said end digits.

2. A control unit according to claim 1, wherein a logic circuit is connected to an output of the decadic counter for transferring pulses to a binary counter.

3. A control unit according to claim 2, wherein a further binary counter is connected to the output of the said binary counter.

4. A control unit according to claim 3, wherein said binary counters each are arranged to count a number of pulses, said number in each case being a higher power of the number two.

5. A control unit according to claim 3 or claim 4, wherein said binary counters receive stop signals to prevent further counting.

6. A control unit according to claim 5, wherein the first mentioned binary counter is connected to a monostable switch for generating a said stop signal, said monostable switch having an input connected to receive an intermediate one of three decadic end digits.

7. A control unit according to claim 5, wherein said further binary counters are connected to a logic circuit for generating a said stop signal, said logic circuit including an input connected to receive the largest one of three decadic end digits.

8. A control unit according to claim 6, wherein the monostable switch transmits an output signal in synchronism with the intermediate one of the three end digits to said logic circuit connected to the output of the decadic counter for preventing said logic circuit from transmitting pulses, corresponding to the lowest one of the three end digits, every second time and to enable said logic circuit to transmit said pulses every other second time, in response to the monostable pulse switch reveiving a pulse, corresponding to the intermediate one of the end digits.

9. A control unit according to claim 1, further comprising a control circuit responsive to pulses corresponding to the largest one of three end digits for controlling reversing of contacts for the change of charge in the equivalent electrical circuit at a time when such a reversing of contacts is not influenced by other operations controlled in sequence by the intermediate one or the lowest one of three end digits.

10. A control unit according to claim 1, wherein the pulse frequency of the pulse generator is on the order of magnitude of 1 megacycle a second.

11. A control unit according to claim 10, wherein the pulse generator is crystal controlled.

12. A control unit according to claim 10 or 11, wherein the pulse frequency of the pulse generator is decreased by division by two to an order of magnitude of about 1 kilocycle a second.

13. A control unit according to claim 1, wherein the output pulses from the decadic pulse frequency divider having end digits in a decadic series of values, possesses end digits which differ from each other by two units.

14. A control unit according to claim 13, wherein the end digits indicating the pulse sequence are uneven numbers.

* * * * *